US006801513B1

United States Patent
Gibbons et al.

(10) Patent No.: US 6,801,513 B1
(45) Date of Patent: Oct. 5, 2004

(54) METHODS AND APPARATUS FOR DYNAMICALLY ASSIGNING TIME SLOTS IN A WIRELESS COMMUNICATION SYSTEM

(75) Inventors: David B. Gibbons, Redmond, WA (US); Eamonn Gormley, Seattle, WA (US); Liang A. Hong, Redmond, WA (US); Elliott Hoole, Redmond, WA (US); Kamyar Moinzadeh, Renton, WA (US)

(73) Assignee: AT&T Wireless Services, Inc., Redmond, WA (US)

( * ) Notice: Subject to any disclaimer, the term of this patent is extended or adjusted under 35 U.S.C. 154(b) by 694 days.

(21) Appl. No.: 09/597,044

(22) Filed: Jun. 20, 2000

Related U.S. Application Data

(60) Provisional application No. 60/140,959, filed on Jun. 23, 1999.

(51) Int. Cl.[7] .................................................. H04J 1/16
(52) U.S. Cl. .................................... 370/337; 370/442
(58) Field of Search ................................. 370/328, 329, 370/335, 336, 337, 448, 442, 468, 461, 462, 470, 384, 535, 537, 347, 341, 401, 431, 437, 443, 444, 455, 456–459

(56) References Cited

U.S. PATENT DOCUMENTS

| | | | |
|---|---|---|---|
| 4,928,273 A | 5/1990 | Protopapas | 370/458 |
| 4,949,395 A | 8/1990 | Rydbeck | 455/435 |
| 5,260,944 A * | 11/1993 | Tomabechi | 370/347 |
| 5,384,777 A | 1/1995 | Ahmadi et al. | 370/337 |
| 5,513,183 A * | 4/1996 | Kay et al. | 370/337 |
| 5,602,836 A * | 2/1997 | Papadopoulos et al. | 370/280 |
| 5,802,046 A * | 9/1998 | Scott | 370/280 |
| 5,802,061 A | 9/1998 | Agarwal | 370/461 |
| 6,094,426 A * | 7/2000 | Honkasalo et al. | 370/331 |
| 6,097,707 A * | 8/2000 | Hodzic et al. | 370/321 |
| 6,532,225 B1 * | 3/2003 | Chang et al. | 370/341 |
| 6,567,416 B1 * | 5/2003 | Chuah | 370/418 |

* cited by examiner

Primary Examiner—Dang Ton

(57) ABSTRACT

A wireless communication system having a base unit and a plurality of remote transceiver units utilizes a dynamic time slot assignment scheme for channel access. The base unit receives and processes a channel access request message from a remote transceiver unit and prepares a channel measurement request message in response. If an $M^{th}$ time slot of a time frame is available, the base unit sends this message in the $M^{th}$ time slot and receives a message having channel measurement data in the $M^{th}$ time slot of the next time frame. On the other hand, if the $M^{th}$ time slot of the time frame is already reserved, the base unit sends the message in an $N^{th}$ time slot of the time frame and receives a message having the channel measurement data in the $N^{th}$ time slot of the next time frame. The base unit selects, based on the channel measurement data, an appropriate channel for communication for the remote transceiver unit, Continuing with use of the dynamic slot assignment, the base unit sends a message having a channel identifier associated with the selected channel and receives an acknowledgement from the remote transceiver unit in response.

20 Claims, 7 Drawing Sheets

FIGURE 7A

| | 7 | 6 | 5 | 4 | 3 | 2 | 1 | 0 |
|---|---|---|---|---|---|---|---|---|
| Octet 1 | RU Acc ID | | Base Access ID | | | | | |
| Octet 2 | BSOC | | | Message ID | | | | |
| Octet 3 | Payload | | | | | | | |
| Octet 4 | Payload | | | | | | | |
| Octet 5 | Payload | | | | | | | |
| Octet 6 | Payload | | | | | | | |
| Octet 7 | Payload | | | | | | | |
| Octet 8 | Payload | | | | | | | |
| Octet 9 | Payload | | | | | | | |

FIGURE 7B

| | 7 | 6 | 5 | 4 | 3 | 2 | 1 | 0 |
|---|---|---|---|---|---|---|---|---|
| Octet 1 | Subband | | | Sequence Number | | | | M |
| Octet 2 | BSOC | | | Message ID | | | | |
| Octet 3 | HSN (24-31) | | | | | | | |
| Octet 4 | HSN (16-23) | | | | | | | |
| Octet 5 | HSN (8-15) | | | | | | | |
| Octet 6 | HSN (0-7) | | | | | | | |
| Octet 7 | Payload | | | | | | | |
| Octet 8 | Payload | | | | | | | |
| Octet 9 | Payload | | | | | | | |

FIGURE 7C

| Octet | 7 | 6 | 5 | 4 | 3 | 2 | 1 | 0 |
|---|---|---|---|---|---|---|---|---|
| 1 | RU Acc Id | | Base Access ID | | | | | |
| 2 | BSOC | | | Message ID | | | | |
| 3 | Reserved | | RU ID (8-13) | | | | | |
| 4 | RU ID (0-7) | | | | | | | |
| 5 | Payload | | | | | | | |
| 6 | Payload | | | | | | | |
| 7 | Payload | | | | | | | |
| 8 | Payload | | | | | | | |
| 9 | Payload | | | | | | | |

US 6,801,513 B1

METHODS AND APPARATUS FOR DYNAMICALLY ASSIGNING TIME SLOTS IN A WIRELESS COMMUNICATION SYSTEM

RELATED APPLICATIONS

This application claims the benefit of U.S. Provisional Application No. 60/140,959, filed Jun. 23, 1999 and entitled "Method for Establishing a Communication Channel in a Personal Wireless Access Network," which is incorporated herein in its entirety.

The following applications, assigned to the Assignee of the current invention, and being filed concurrently, contain material related to the subject matter of this application, and are incorporated herein by reference:

D. Gibbons et al., entitled "Establishing a Communication Channel in a Wireless Network," U.S. Ser. No. 09/577,043, filed Jun. 20, 2000.

L. Hong et al., entitled "Polling Methods for Use in a Wireless Communication System," U.S. Ser. No. 09/597,016, filed Jun. 20, 2000.

BACKGROUND OF THE INVENTION

1. Field of the Invention

The present invention relates generally to wireless communication systems utilizing time division multiple access (TDMA) techniques, and more particularly to the assignment of time slots in a dynamic fashion in such communication systems.

2. Description of the Related Art

In cellular telephone systems, methods for assigning time slots in a dynamic fashion are known. These methods exist, for example, in Global Systems for Mobile (GSM) communication systems. Such systems define multiple time slots, each of which may be uniquely assigned to a mobile unit for communication. Here, one of the time slots that is not already in use is selected for temporary use in a communication between base and mobile units, another one of the time slots is selected subsequently, and so on. Other systems, such as "fixed wireless systems," however, are inherently different from cellular telephone systems. What is needed are alternative methods of dynamically assigning time slots which are suitable to other systems, such as fixed wireless systems.

SUMMARY OF THE INVENTION

Methods and apparatus for dynamically assigning time slots in a wireless communication system are described. One method includes the initial steps of receiving, at a base unit, a first message from a remote transceiver unit; and processing the first message and generating a second message in response. The method includes the further steps of, when an Me time slot of a time frame is available, sending, from the base unit to the remote transceiver unit, the second message that is responsive to the first message in the $M^{th}$ time slot; and receiving, at the base unit from the remote transceiver unit, a third message that is responsive to the second message in the $M^{th}$ time slot of a following time frame. The method includes the further steps of, when the $M^{th}$ time slot of the time frame is unavailable, sending, from the base unit to the remote transceiver unit, the second message that is responsive to the first message in an $N^{th}$ time slot of the time frame, where the $N^{th}$ time slot follows the $M^{th}$ time slot in the time frame; and receiving, at the base unit from the remote transceiver unit, the third message that is responsive to the second message in the $N^{th}$ time slot of the following time frame.

If both the $M^{th}$ and $N^{th}$ time slots are unavailable, the base unit may assign other subsequent time slots in the time frame in a similar fashion (e.g., $P^{th}$ or $Q^{th}$ time slots). The dynamic slot assignment is advantageously applied to a call establishment scheme, where the first message is a channel access request message, the second message is a channel measurement request message, and the third message is a channel measurement data message. The base unit selects a channel for communication based on the channel measurement data and, continuing with the dynamic slot assignment, sends a message having a channel identifier associated with the selected channel and receives an acknowledgement from the remote transceiver unit.

BRIEF DESCRIPTION OF THE DRAWINGS

FIGS. 7A, 7B, and 7C depict the structures of an unsolicited CAC message, a solicited CAC message, and an installation CAC message, respectively, in accordance with one embodiment of the present invention.

DETAILED DESCRIPTION OF THE PREFERRED EMBODIMENTS

Methods and apparatus for dynamically assigning time slots in a wireless communication system are described. A base unit receives a message from a transceiver unit and generates a message in response. The base unit identifies the next available and unreserved time slot "M" of a time frame having L time slots, and reserves it for communication with the transceiver unit. The base unit sends the response message in the $M^{th}$ time slot of the time frame, and receives a message from the transceiver unit in the $M^{th}$ time slot of the next time frame in a predetermined fashion. Thereafter, the base unit unreserves the $M^{th}$ time slot for subsequent use in connection with that or another transceiver unit. The process repeats, where "M" may be a different number in each pass. When applied in a call establishment procedure, the process repeats until a traffic channel is assigned for communications. The method is performed substantially simultaneously at the base unit for each one of multiple transceiver units.

Figure 1:
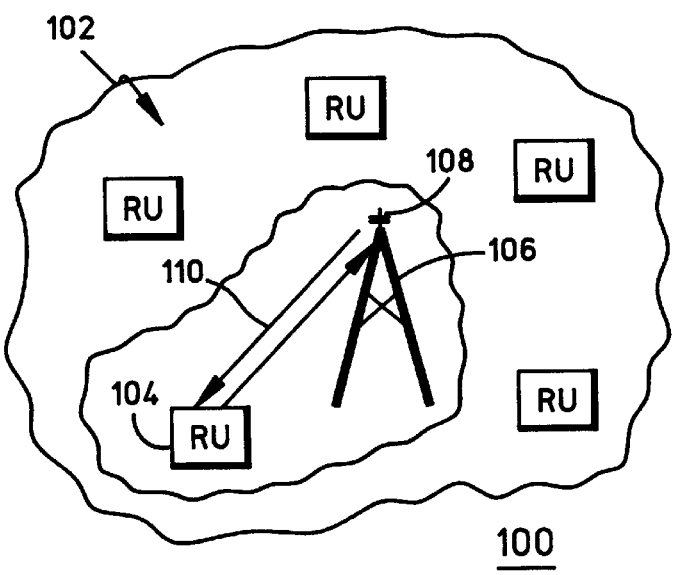
FIG. 1 is an illustration of a wireless communication system which may embody the present invention, the wireless communication system including at least one base unit and a plurality of transceiver units.

FIG. 1 is an illustrative representation of a wireless communication system 100 which utilizes time division multiple access (TDMA) or TDMA-like communication methodologies. Wireless communication system 100 includes at least one base unit 106 having one or more antennas 108, and a plurality of remote units 102 ("RUs" or "receiver units"), such as remote unit 104. Base unit 106 and remote units 102 communicate via radio frequency (RF) signals, such as RF signals 110 between base unit 106 and remote unit 104. Wireless communication system 100 can make use of a number of additional different communication techniques, such as frequency division multiplexing (FDM) or orthogonal frequency division multiplexing (OFDM). Preferably, wireless communication system 100 is a fixed wireless system (FWS), where base unit 106 provides telephone and high-speed data communication to each one of a number of fixed-location subscribers equipped with an RU. In addition, wireless communication system 100 is referred to as a Personal Communication System (PCS) Wireless Access Network (PWAN).

Figure 2:
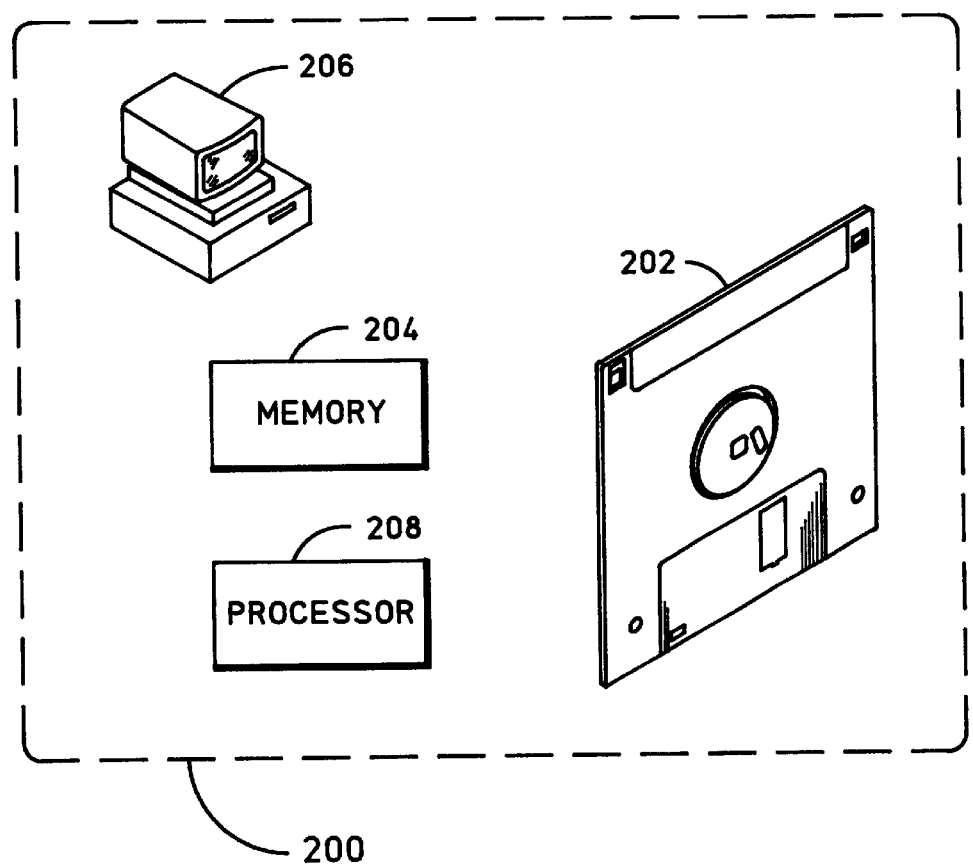
FIG. 2 is an illustration of software components which are suitable for use in implementing the inventive methods described herein.

Referring to FIG. 2, the methods described herein may be embodied and implemented in transceiver unit 104 and base unit 106 of FIG. 1 (as well as other transceiver and base units) in connection with software using software components 200 shown in FIG. 2. The software may be embedded in or stored on a disk 202 or memory 204, executable on a computer 206 or a processor 208. Thus, the inventive features may exist in a signal-bearing medium which embodies a program of machine-readable instructions executable by a processing apparatus which perform the methods.

Figure 3:
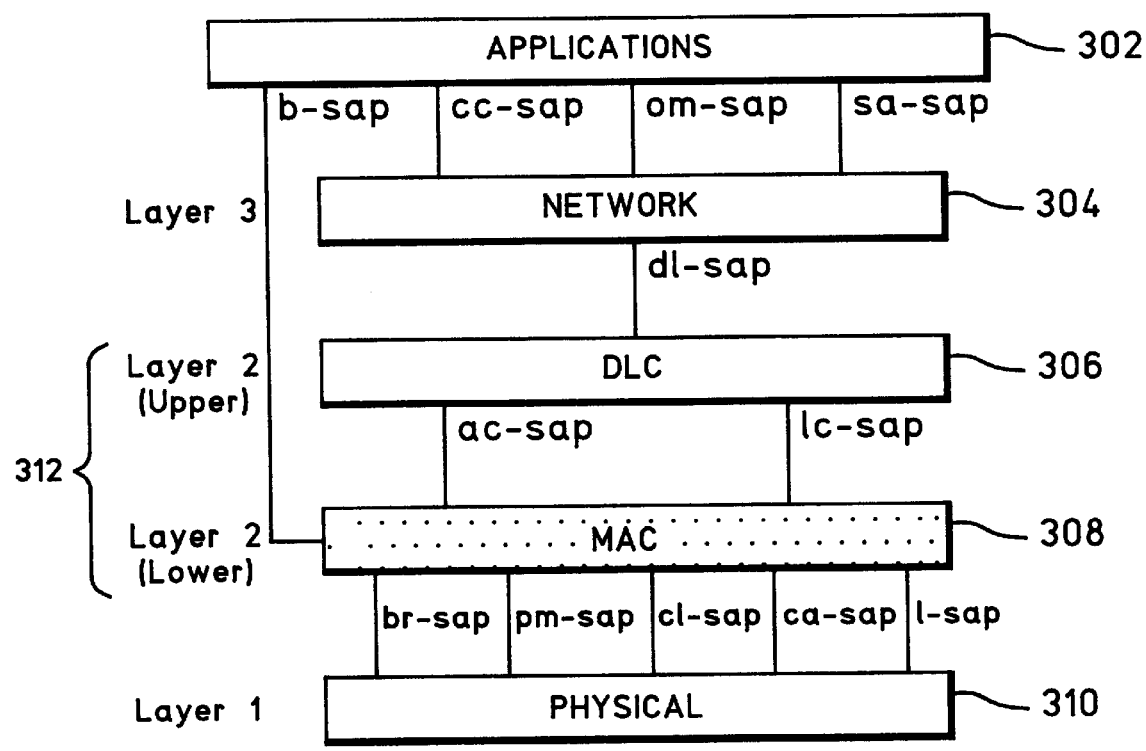
FIG. 3 is an illustrative representation of protocol layers utilized in the base unit and transceiver units.

FIG. 3 is an illustration of a layered architecture 300 utilized in wireless communication system 100 of FIG. 1. The layering principles of the Reference Model for Open System Interconnection (OSI) as contained in International Telegraph and Telephone Consultative Committee (CCITT) recommendations X.200 and X.210 are well-known in the art. Layered architecture 300 includes an applications layer 302 (or Layer 4), a network layer 304 (or Layer 3), a data link layer 312 (or Layer 2), and a physical layer 310 (or Layer 1). Data link layer 312 of the PWAN consists of two sublayers, the data link control (DLC) 306 and the medium access control (MAC) 308. Each sublayer is defined independently and interfaces to adjacent layers through a set of primitives and service access points (SAPs). The layering principles of the Reference Model for Open System Interconnection (OSI) as contained in International Telegraph and Telephone Consultative Committee (CCITT) recommendations X.200 and X.210 are well-known in the art.

MAC 308 interfaces to adjacent layers by the use of protocol primitives. MAC 308 interfaces with DLC 306, which resides above MAC 308. MAC 308 also interfaces with the "airlink" physical layer 310, which resides below MAC 308. In addition, MAC 308 provides interfaces to a local Radio Management Entity (RME) and to a broadcast control application (both not shown in FIG. 3). MAC 308 provides an orderly and efficient use of physical layer 310 to DLC 306. Two services are provided by MAC 308: access control service and link control service.

The access control service provides a mechanism for DLC 306 to set up physical channels from either base unit 106 or transceiver unit 104. MAC 308 is responsible for the attachment of a cyclic redundancy check (CRC) checksum to access control messages prior to submittal to physical layer 310. The CRC is checked on the receiving end to detect errors in transmission. The link control service provides physical layer access to messages submitted from DLC 306 for link control functions. Further, link control service provides a prioritized data delivery service, as well as segmentation and reassembly of long messages. Link control service handles a CRC-16 checksum for link control messages prior to submittal to or reception from physical layer 310.

Broadcast service provides a means for the applications to access the broadcast medium. In base unit 106, this service is required for transmitting broadcast messages; in transceiver unit 104, this service is required for receiving broadcast messages. Physical layer 310 is the lowest layer in the OSI Reference Model and it supports all functions for the transmission of bit streams on the physical medium. These bit streams are transferred on traffic and control channels. The following are some of the services required by physical layer 310:(1) the ability to generate a physical airlink connection (simplex or full duplex) for the transmission of bits in the same order in which they are submitted to physical layer 310; and (2) a broadcast capability between base unit 106 and multiple tranceiver units.

Figure 4:
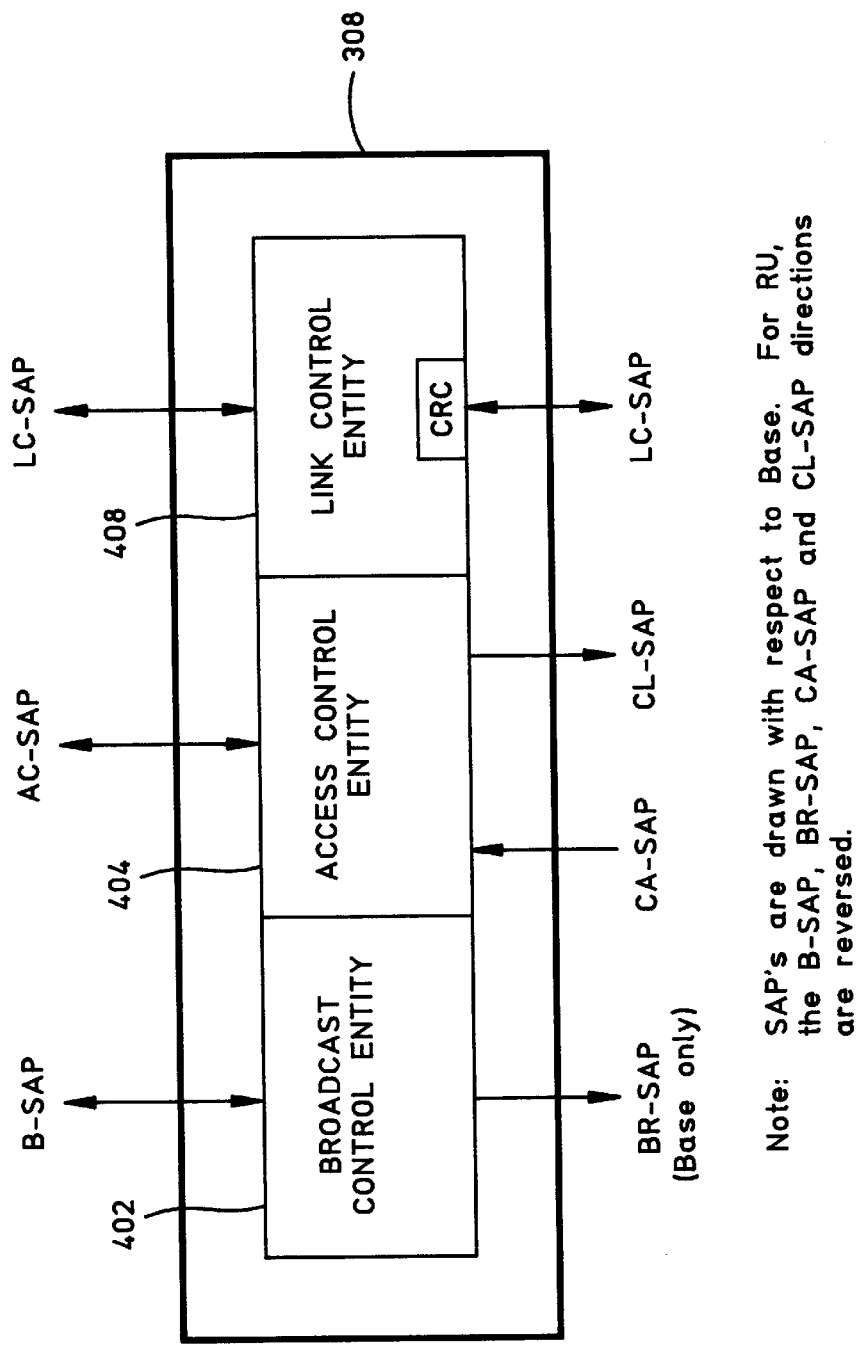
FIG. 4 is an illustrative representation of a Medium Access Channel (MAC) layer utilized in the base unit and transceiver units.

FIG. 4 is an illustration of an internal architecture of MAC 308 of FIG. 3. Internal MAC entities include a broadcast control entity 402, an access control entity 404, and a link control entity 408. SAPs provide communication channels to other layers in the system. Broadcast control entity 402 provides a broadcast service from base unit 106 to transceiver units. It communicates with an associated application via the B-SAP, and with physical layer 310 via the BR-SAR. Access control entity 404 provides the functions necessary to gain access to the physical layer services. It communicates with DLC 306 via an AC-SAP. Access control entity 404 communicates with physical layer 310 via a common access SAP (CA-SAP) and a common link SAP (CL-SAP). Finally, link control entity 408 accepts service requests for data transferred from DLC 306 and performs the necessary transformations to submit the information to physical layer 310. This link control entity 408 utilizes the services of segmentation for its messages at the DSP physical layer.

The access control mechanism provides base unit 106 and its constituent transceiver units 102 with a mechanism to communicate prior to the setup of a connection-oriented datalink for the purposes of, among other things, setup of a connection-oriented traffic and associated data link channel. The access control mechanism uses Common Access channel (CAC) and Common Link channel (CLC) for this communication. The physical layer provides the following CAC/CLC channels/code keys per subband pair for use by access control: (1) one CLC channel with one code key; and (2) two CAC channels with two code keys each. Transceiver units are assigned to a particular subband pair and CAC channel in the start-up procedure.

Messages transmitted over the CAC channel can be sent in either a solicited (S-CAC) or unsolicited (U-CAC) fashion. With respect to unsolicited CAC transmissions, when transceiver unit 104 initiates a call (i.e., originating call), it utilizes an unsolicited transmission approach. Here, transceiver unit 104 transmits a CAC message in the first available time slot and does not wait to be scheduled. Slotted ALOHA access scheme is used for U-CAC transmissions. If the unsolicited CAC transmission is not acknowledged by base unit 106 via the CLC in some given period of time (t_mac-access), then transceiver unit 104 waits a random period of time (t_mac-AccessBackoff) before re-trying the unsolicited CAC transmission. This process will continue up to a provisionable number of times (n_mac-access).

With respect to solicited CAC or S-CAC transmissions, after the initial .access to the system, transceiver unit 104 uses a scheduled CAC channel for the --remainder of a call establishment procedure in a predefined dynamic slot assignment scheme, which is described below. Transceiver unit 104 is guaranteed a collision-free transmission on the CAC at this time. Since transceiver unit 104 ID is dynamically assigned, certain messages exchanging during start-up have to use a transceiver unit Hardware Serial Number (HSN) as an identifier.

As described above, the CAC and CLC messages that are used for transceiver unit access to the PWAN use a DSA-TDMA scheme to access the medium. Each CAC or CLC message is transmitted in one 3 millisecond time slot of a 12 millisecond frame (four time slots per time frame). Slots are counted in a relative sense at both base unit 106 and transceiver unit 104 and are assigned dynamically throughout the call establishment procedure. Base unit 106 and transceiver unit 104 maintain a slot count from one to N (n-mac-dsaslots), where N (n-mac-dsaslots) is a provisionable value that is the same at both base unit 106 and transceiver unit 104. At any given time, the current value of the slot count may not necessarily be equal at base unit 106 and transceiver unit 104.

Figure 5:
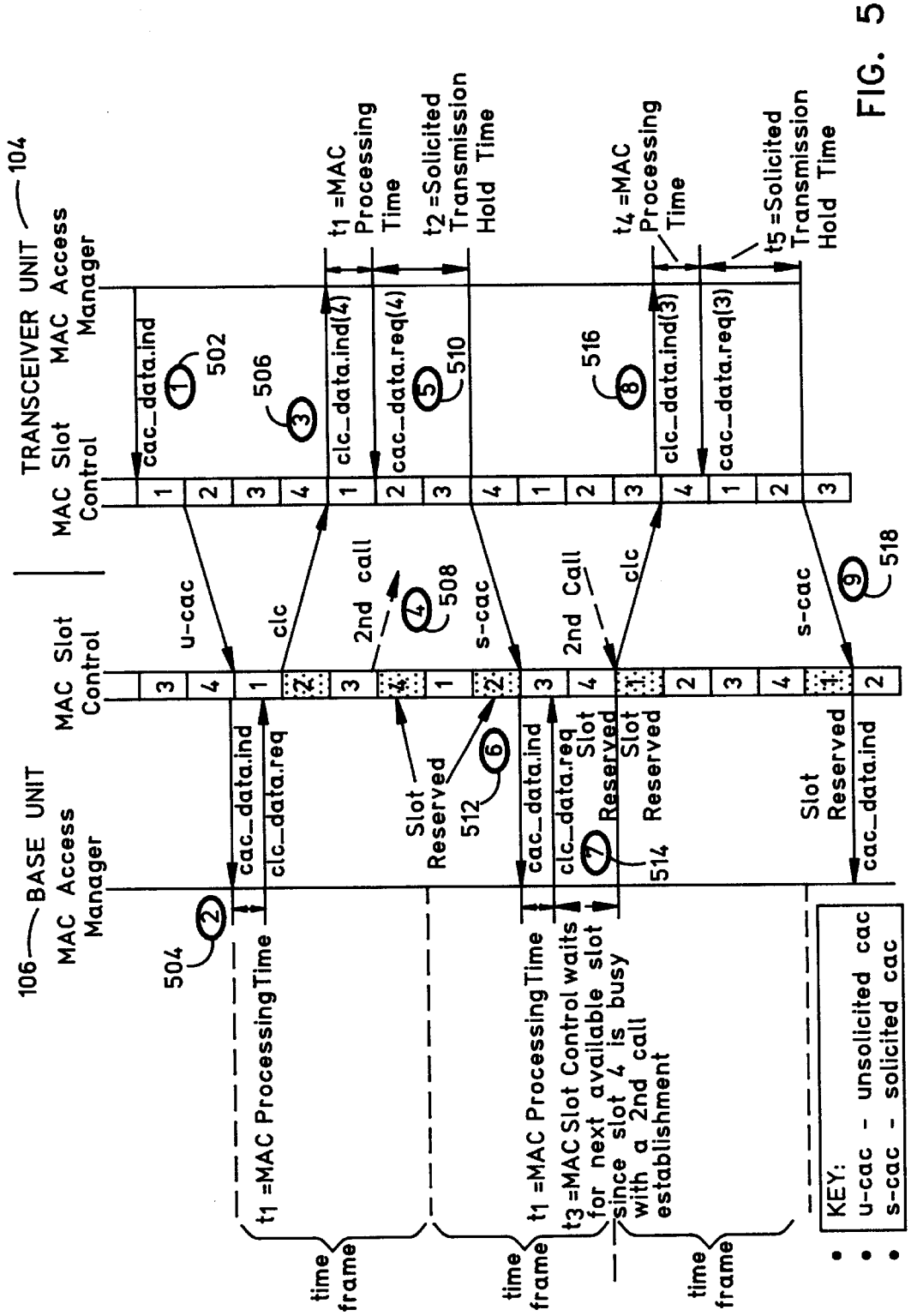
FIG. 5 is a process diagram which describes a method for dynamically assigning time slots in the wireless communication system of FIG. 1.

FIG. 5 is a process diagram which describes a method for dynamically assigning slots in a communication system. More particularly, FIG. 5 illustrates the DSA-TDMA procedure for an originating call message sequence. The inventive method or procedure in which the slot resources are managed at base unit 106 and transceiver unit 104 to accomplish the solicited messaging is what is emphasized in the following description.

Transceiver unit 104 is required to originate a connection and therefore transmits an ACCESS message using the UCAC channel in the first available slot (step 502 or [1]). The retry mechanism is of a slotted ALOHA nature. In the example shown, the first available slot is Transceiver Slot #2. The message sent from transceiver unit 104 at step 502 may be referred to as a "channel access request message" or a "call establishment request message" (e.g., for a telephone or voice call). MAC access manager of base unit 106 receives the ACCESS message in the form of a cac-data.ind primitive (step 504 or [2]).

The MAC will process this message and, if bandwidth in the cell is available, reply to the accessing transceiver unit 104 with a CONNECT message via the CLC channel. The CONNECT message is delivered to the MAC slot control mechanism via a clc-data.req primitive. The MAC slot control entity transmits the CONNECT message in the next available time slot, which in this case is Base Slot #2. The MAC slot control entity in base unit 106 then starts a watchdog timer ($T_1$) associated with Base Slot #2. If a solicited CAC message is not received in this time slot within this time, the MAC slot control entity "frees" the slot. The message sent from base unit 106 here may be referred to as a "channel measurement request message." This message is a request to transceiver unit 104 to measure a plurality of traffic channels in the system for subsequent selection of the single best channel to use for communication.

The MAC slot control entity of transceiver unit 104 receives the CONNECT in Transceiver Slot #4, and delivers the CONNECT to the MAC access manager of transceiver unit 104 via a clc-data.ind tagged with Transceiver Slot #4 (step 506 or [3]). The MAC access manager of transceiver unit 104 processes the CONNECT message and submits a CONNECT-ACK message via a cac-data.req primitive to the MAC slot control entity. The MAC access manager tags this primitive with Transceiver Slot #4, representing the slot in which the associated CONNECT message was received. Note that Transceiver Slot #4 is not used by the MAC access manager of transceiver unit 104. As an example of a busy condition, a second simultaneous link establishment may occur with the same or perhaps a second transceiver unit utilizing Base Slot #4 (step 508 or [4]). Base Slot #4 is now busy and reserved.

The MAC slot control entity of transceiver unit 104 receives the cac-data.req primitive containing the CONNECT-ACK message (step 510 or [5]). This message will be transmitted using the solicited CAC (s-cac) key in Transceiver Slot #4. As apparent in FIG. 5, for each "cycle" or pair of consecutive time frames, messages are received and sent in the same time slot. This implies that the MAC slot control entity needs to defer the message until Transceiver Slot #4 becomes available; this is an inherent delay in this solicited TDMA approach. The message sent at step 510 may be referred to as a "channel measurement data message" since, in response to the previous message from base unit 106, transceiver unit 104 measured a number of different traffic channels and placed measurement data in the channel measurement data message.

The MAC slot control entity of base unit 106 receives the CONNECT-ACK message during Base Slot #2, as expected (step 512 or [6]). The MAC slot control entity of base unit 106 frees up Base Slot #2 as a resource that may be used by other Base MAC access managers, and then resets and disables the watchdog timer $T_1$. The CONNECT-ACK message is processed. The channel measurement data in the message is used by base unit 106 to select one of the plurality of traffic channels for communication.

The MAC access manager of base unit 106 continues to process the CONNECT-ACK message, responding with a DELAY message and submitting this message via a clc-data.req primitive to the MAC slot control entity of base unit 106 during Base Slot #3 (step 514 or [7]). The MAC slot control entity of base unit 106 waits until the next available slot to transmit this message over the CLC channel. In this case, the next available slot is Base Slot #1, since Base Slot #4 is busy with a second call establishment. The message is transmitted in Base Slot #1 and watchdog timer $T_1$ is again enabled. This message contains a channel identifier uniquely associated with the selected channel for communication.

The MAC slot control entity of transceiver unit 104 receives the DELAY message during Transceiver Slot #3 (step 516 or [8]). The DELAY message is delivered to the MAC access manager of transceiver unit 104 and tagged with Transceiver Slot #3. The MAC access manager of transceiver unit 104 processes this message and responds with a DELAY.ACK message which is delivered in a cac-data.req primitive. The MAC slot control entity then waits for Transceiver Slot #3 and transmits the DELAY-ACK message. The cac-data.ind arrives at base unit 106 during Base Slot #1 as expected (step 518 or [9]). The MAC slot control entity of base unit 106 will free Base Slot #1 as a resource that may be used for other Base MAC access managers and resets and disables the watchdog timer $T_1$. This message may be referred to as an acknowledgement message from transceiver unit 104.

Reviewing the call process diagram of FIG. 5, the first message sent from transceiver unit 104 at step 502 may be a channel access request message or a call establishment request message, the second message sent from base unit 106 at step 504 may be a channel measurement request message, the third message sent from transceiver unit 104 at step 510 may be a channel measurement data message, the fourth message sent from base unit 106 at step 514 may be a channel identification message, and the fifth message sent from transceiver unit 104 at step 518 may be an acknowledgement message. When transceiver unit 104 receives the selected and assigned traffic channel, it performs conventional synchronization and training on that traffic channel. Thereafter, transceiver and base units 104 and 106 communicate over the selected traffic channel until termination. The traffic channel may be a voice traffic channel for a telephone call, or a data traffic channel for communicating high speed data such as Internet data.

Figure 6:
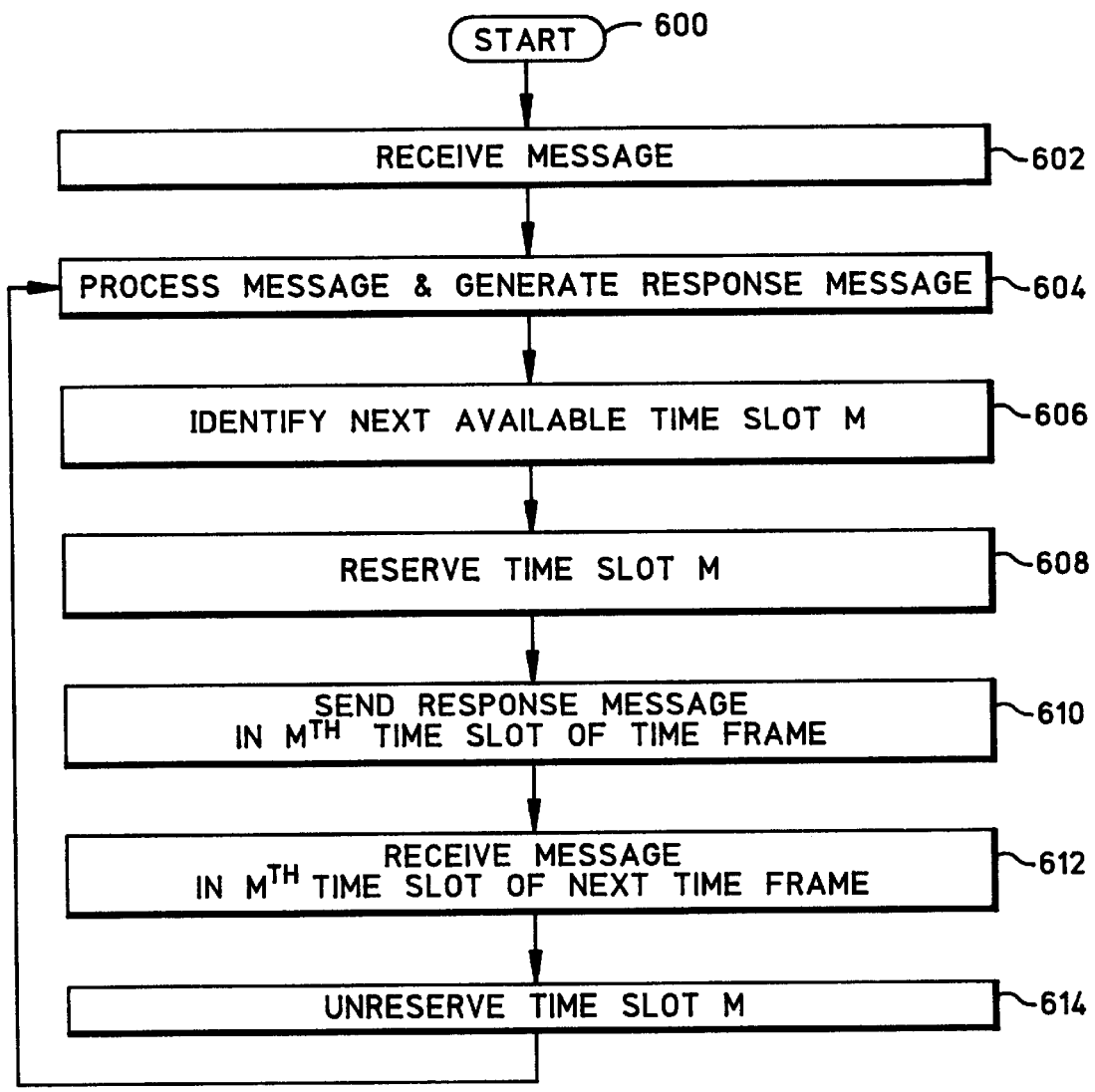
FIG. 6 is a flowchart describing a method for dynamically assigning time slots in the wireless communication system of FIG. 1.

FIG. 6 is a flowchart describing more generally the method for dynamically assigning time slots in wireless communication system 100 of FIG. 1. Beginning at a start block. 600, base unit 106 receives a message from transceiver unit 104 (step 602). Base unit 106 processes this message and generates a message in response (step 604). Next, base unit 106 identifies the next time slot "M" (of a time frame having L time slots) that is available and unreserved (step 606), and reserves it for communication with transceiver unit 104 (step 608). As an example, the $M^{th}$ available time slot may be the $1^{st}$ time slot, the $2^{nd}$ time slot, the $3^{rd}$ time slot, or the $4^{th}$ time slot of a time frame having four time slots. Base unit 106 sends the response message in the $M^{th}$ time slot of a time frame (step 610). Before a predetermined time period expires, base unit 106 receives a message from transceiver unit 104 in the $M^{th}$ time slot of the next time frame (step 612), as expected. This message is responsive to the message sent by base unit 106 in step 610. Thereafter, base unit 106 unreserves the time slot for subsequent use in connection with transceiver unit 104 or another transceiver unit (step 614). This process repeats starting again at step 604, where M may be different for each pass in step 606. When applied in a call establishment procedure, the process repeats until a traffic channel is assigned for communications. The method is performed substantially simultaneously at base unit 106 for each one of multiple transceiver units desiring access.

Thus, methods for dynamically assigning time slots between a base unit and a transceiver unit of a wireless communication system defining L time slots per time frame have been described. In one method, the initial steps include receiving, at a base unit, a first message; and processing the first message and generating a second message in response. The method includes the further steps of, when an $M^{th}$ time slot of a time frame is available, sending, from the base unit, the second message that is responsive to the first message in the $M^{th}$ time slot; and receiving, at the base unit, a third message that is responsive to the second message in the $M^{th}$ time slot of a following time frame. The method includes the further steps of, when the $M^{th}$ time slot of the time frame is unavailable, sending, from the base unit, the second message that is responsive to the first message in an $N^{th}$ time slot of the time frame, the $N^{th}$ time slot following the $M^{th}$ time slot in the time frame; and receiving, at the base unit, the third message that is responsive to the second message in the $N^{th}$ time slot of the following time frame.

The method may include the further steps of, when the $M^{th}$ time slot of the time frame is available, reserving the $M^{th}$ time slot of the following time frame prior to receiving the third message; and unreserving the $M^{th}$ time slot for after receiving the third message in the $M^{th}$ time slot of the following time frame. Similarly, the method may include the further steps of, when the $M^{th}$ time slot of the time frame is unavailable, reserving the $N^{th}$ time slot of the following time frame prior to receiving the third message; and unreserving the $N^{th}$ time slot after receiving the third message in the $N^{th}$ time slot of the following time frame. In a call establishment procedure, the first message may be a channel access request for communication, the second message may be a channel measurement request, and the third message may include channel measurement data.

Another method for dynamically assigning time slots in wireless communication system includes the steps of identifying a next available time slot M of a time frame having L time slots; reserving the $M^{th}$ time slot of the time frame; sending a first message in the $M^{th}$ time slot of the time frame; receiving a second message that is responsive to the first message in an $M^{th}$ time slot of a following time frame; and unreserving the $M^{th}$ time slot for subsequent use.

FIGS. 7A, 7B, and 7C depict the structures of an unsolicited CAC message, a solicited CAC message, and an installation CAC message, respectively, in accordance with one embodiment of the present invention. These figures show the assignment of each bit of the 9 octets of the CAC messages. In these figures, the "RU Access ID" is the identified used by the remote unit (RU) to distinguish sessions, the "Base Access ID" is the identified used by the Base to distinguish sessions, the "BSOC" is the base station offset code, the "Message ID" is the message identifier whose contents is in the payload field, the "Subband" is the subband in which the RU is operating, the "Seq Number" is the identifier of a segmented message, "M" is the "more" bit, where a 0/1 indicates none/more to follow, the "RU ID" identifies the RU of interest, the "HSN" is the hardware serial number, and the "Payload" is the CAC message payload, including up to 5 bytes for UCAC, 7 bytes for SCAC, and 3 bytes for an installation CAC.

Figure 8:
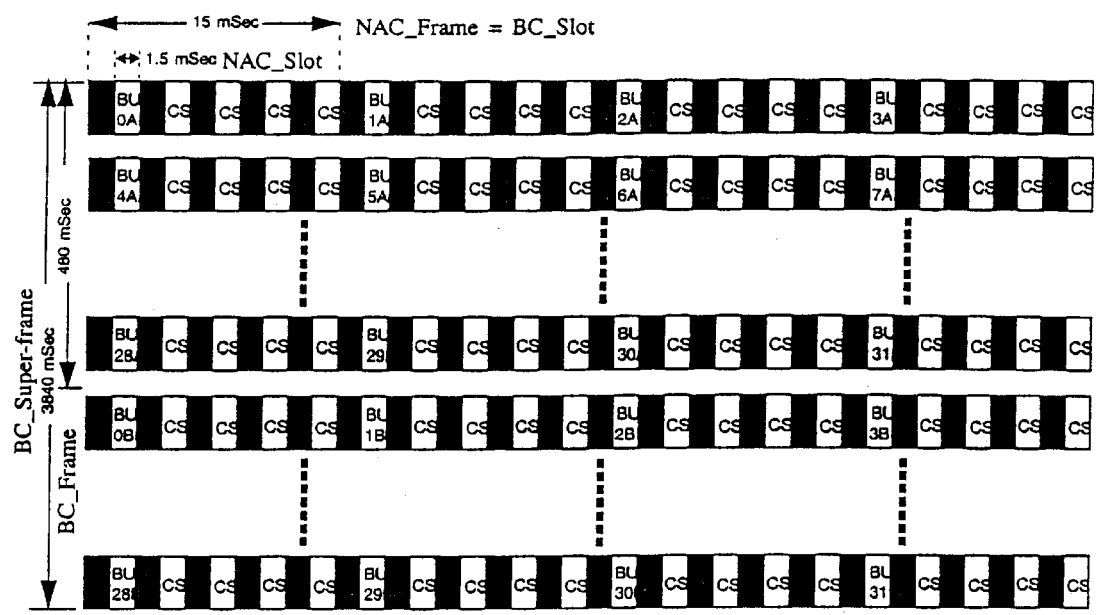
FIG. 8 depicts a network access channel and broadcast frame structure in accordance with a preferred embodiment of the present invention.

FIG. 8 depicts a network access channel and broadcast frame structure in accordance with a preferred embodiment of the present invention. As shown in FIG. 8, each network access channel (NAC) slot occupies four consecutive timeslots over 1.5 ms and contains a single NAC message. A NAC frame consists of five NAC slots occupying the second half of each of five TDMA frames over 15 ms. The five NAC slots in each NAC frame are comprised of one BRC/UCAC slot and four CLC/SCAC slots.

Each base is assigned an offset code (BSOC) to create a time reuse pattern of 32. A broadcast slow (BC slot) is defined as being one NAC frame in duration. Each Base, Bn, transmits a single broadcast message in its assigned BC slot. The cycle consisting of 32 BC slots is defined as a Broadcast Frame (BC Frame). The BC Frame has duration 32×15 ms=480 ms. Thus each Base transmits one broadcast message every BC frame. The BC message cycle requires eight broadcast messages for each base, thus requiring the definition of the broadcast super frame. A broadcast super frame consists of eight broadcast slots (256 BC Frames) occupying a duration of 8*32*15 ms=3840 ms. Each Phase of the BC super frame in FIG. 2. 7 is designated with a letter from A to H.

It should be readily apparent and understood that the foregoing description is only illustrative of the invention and in particular provides preferred embodiments thereof. Various alternatives and modifications can be devised by those skilled in the art without departing from the true spirit and scope of the invention. Accordingly, the present invention is intended to embrace all such alternatives, modifications, and variations which fall within the scope of the appended claims.

What is claimed is:

1. A method for dynamically assigning time slots between a base unit and a transceiver unit of a wireless communication system defining L time slots per time frame, the method comprising:

receiving a first message;

processing the first message and generating a second message in response;

when an $M^{th}$ time slot of a time frame is available:
   sending the second message that is responsive to the first message in the $M^{th}$ time slot;
   receiving a third message that is responsive to the second message in the $M^{th}$ time slot of a following time frame;
when the $M^{th}$ time slot of the time frame is unavailable:
   sending the second message that is responsive to the first message in an $N^{th}$ time slot of the time frame, the $N^{th}$ time slot following the $M^{th}$ time slot in the time frame; and
   receiving the third message that is responsive to the second message in the $N^{th}$ time slot of the following time frame.

2. The method according to claim 1, further comprising:
when the $M^{th}$ and $N^{th}$ time slots of the time frame are unavailable:
   sending the second message that is responsive to the first message in a $P^{th}$ time slot of the time frame, the $P^{th}$ time slot following the $M^{th}$ and $N^{th}$ time slots in the time frame; and
   receiving the third message that is responsive to the second message in the $P^{th}$ time slot of the following time frame.

3. The method according to claim 1, wherein the first message comprises a channel access request for communication.

4. The method according to claim 1, wherein the first message comprises a channel access request for communication, the second message comprises a channel measurement request, and the third message comprises channel measurement data.

5. The method according to claim 1, further comprising:
when the $M^{th}$ time slot of the time frame is available:
   reserving the $M^{th}$ time slot of the following time frame prior to receiving the third message; and
when the $M^{th}$ time slot of the time frame is unavailable:
   reserving the $N^{th}$ time slot of the following time frame prior to receiving the third message.

6. The method according to claim 1, further comprising:
when the $M^{th}$ time slot of the time frame is available:
   reserving the $M^{th}$ time slot of the following time frame prior to receiving the third message;
   unreserving the $M^{th}$ time slot for after receiving the third message in the $M^{th}$ time slot of the following time frame;
when the $M^{th}$ time slot of the time frame is unavailable:
   reserving the $N^{th}$ time slot of the following time frame prior to receiving the third message; and
   unreserving the $N^{th}$ time slot after receiving the third message in the $N^{th}$ time slot of the following time frame.

7. The method according to claim 1, wherein the first message comprises a Common Access channel (CAC) message and the second message comprises a Common Link Channel (CLC) message.

8. A base unit for use in a wireless communication system having a plurality of remote transceiver units, the base unit comprising:
a wireless transceiver;
one or more processors coupled to the wireless transceiver;
the wireless transceiver and the one or more processors being operative for:
   receiving a first message;
   processing the first message and generating a second message in response;
   when an $M^{th}$ time slot of a time frame is available:
      sending the second message in the $M^{th}$ time slot;
      receiving a third message that is responsive to the second message in the $M^{th}$ time slot of a following time frame;
   when the $M^{th}$ time slot of the time frame is unavailable:
      sending the second message in an $N^{th}$ time slot of the time frame, the $N^{th}$ time slot following the $M^{th}$ time slot in the time frame; and
      receiving the third message that is responsive to the second message in the $N^{th}$ time slot of the following time frame.

9. The base unit according to claim 8, wherein the first message comprises a channel access request for communication.

10. The base unit according to claim 8, wherein the first message comprises a channel access request for communication, the second message comprises a channel measurement request, and the third message comprises channel measurement data.

11. The base unit according to claim 8, wherein the wireless transceiver and the one or more processors are further operative for:
when the $M^{th}$ time slot of the time frame is available:
   reserving the $M^{th}$ time slot of the following time frame prior to receiving the third message; and
when the $M^{th}$ time slot of the time frame is unavailable:
   reserving the $N^{th}$ time slot of the following time frame prior to receiving the third message.

12. The base unit according to claim 8, wherein the wireless transceiver and the one or more processors are further operative for:
when the $M^{th}$ time slot of the time frame is available:
   reserving the $M^{th}$ time slot of the following time frame prior to receiving the third message;
   unreserving the $M^{th}$ time slot for after receiving the third message in the $M^{th}$ time slot of the following time frame;
when the $M^{th}$ time slot of the time frame is unavailable:
   reserving the $N^{th}$ time slot of the following time frame prior to receiving the third message; and
   unreserving the $N^{th}$ time slot after receiving the third message in the $N^{th}$ time slot of the following time frame.

13. The base unit according to claim 8, wherein the first message comprises a Common Access Channel (CAC) message and the second message comprises a Common Link Channel (CLC) message.

14. A wireless communication system, comprising:
a base unit operative for:
   receiving a first message;
   processing the first message and generating a second message in response;
   when an $M^{th}$ time slot of a time frame is available:
      sending the second message in the $M^{th}$ time slot;
      receiving a third message that is responsive to the second message in the $M^{th}$ time slot of a following time frame;
   when the $M^{th}$ time slot of the time frame is unavailable:
      sending the second message in an $N^{th}$ time slot of the time frame, the $N^{th}$ time slot following the $M^{th}$ time slot in the time frame;
      receiving the third message that is responsive to the second message in the $N^{th}$ time slot of the following time frame; and
a remote transceiver unit operative for sending the first message, receiving the second message, and sending the third message.

15. The wireless communication system according to claim 14, wherein the first message comprises a channel access request for communication.

16. The wireless communication system according to claim 15, wherein the first message comprises a channel access request for communication, the second message comprises a channel measurement request, and the third message comprises channel measurement data.

17. The wireless communication system according to claim 14, further comprising:
the base unit being further operative for:
when the $M^{th}$ time slot of the time frame is available:
reserving the $M^{th}$ time slot of the following time frame prior to receiving the third message; and
when the $M^{th}$ time slot of the time frame is unavailable:
reserving the $N^{th}$ time slot of the following time frame prior to receiving the third message.

18. The wireless communication system according to claim 15, further comprising:
the base unit being further operative for:
when the $M^{th}$ time slot of the time frame is available:
reserving the $M^{th}$ time slot of the following time frame prior to receiving the third message;
unreserving the $M^{th}$ time slot for after receiving the third message in the $M^{th}$ time slot of the following time frame;
when the $M^{th}$ time slot of the time frame is unavailable:
reserving the $N^{th}$ time slot of the following time frame prior to receiving the third message; and
unreserving the $N^{th}$ time slot after receiving the third message in the $N^{th}$ time slot of the following time frame.

19. A method for dynamically assigning time slots in wireless communication system, the method comprising:
identifying a next available time slot M of a time frame having L time slots;
reserving the $M^{th}$ time slot of the time frame;
sending a first message in the $M^{th}$ time slot of the time frame;
receiving a second message that is responsive to the first message in an $M^{th}$ time slot of a following time frame; and
unreserving the $M^{th}$ time slot for subsequent use.

20. The method according to claim 19, wherein the first and the second message comprise messages for call establishment.

* * * * *